(12) United States Patent
Takahashi

(10) Patent No.: US 9,407,873 B2
(45) Date of Patent: Aug. 2, 2016

(54) INFORMATION PROCESSING APPARATUS, INFORMATION PROCESSING METHOD, AND COMPUTER PROGRAM PRODUCT

(71) Applicant: Masato Takahashi, Tokyo (JP)

(72) Inventor: Masato Takahashi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/644,819

(22) Filed: Mar. 11, 2015

(65) Prior Publication Data

US 2015/0264317 A1    Sep. 17, 2015

(30) Foreign Application Priority Data

Mar. 14, 2014  (JP) .................................. 2014-052757
Jan. 20, 2015  (JP) .................................. 2015-008877

(51) Int. Cl.
| | |
|---|---|
| *H04N 7/14* | (2006.01) |
| *H04N 7/15* | (2006.01) |
| *G06F 21/00* | (2013.01) |
| *G09G 5/00* | (2006.01) |
| *H04N 21/4363* | (2011.01) |
| *H04N 21/8355* | (2011.01) |

(52) U.S. Cl.
CPC ............... *H04N 7/152* (2013.01); *G06F 21/00* (2013.01); *G09G 5/00* (2013.01); *H04N 21/4363* (2013.01); *H04N 21/8355* (2013.01)

(58) Field of Classification Search
CPC ....................................................... H04N 7/14
USPC ................................. 348/14.01, 14.04, 14.12
See application file for complete search history.

(56) References Cited

U.S. PATENT DOCUMENTS

| | | | | |
|---|---|---|---|---|
| 2009/0237571 | A1* | 9/2009 | Horimoto | ............ H04N 5/4401 348/725 |
| 2014/0371892 | A1 | 12/2014 | Takahashi | |
| 2015/0042887 | A1* | 2/2015 | Schanin | ........... H04N 21/43635 348/706 |

FOREIGN PATENT DOCUMENTS

| | | |
|---|---|---|
| JP | 2010-041384 | 2/2010 |
| JP | 4502031 | 4/2010 |
| JP | 2012-004964 | 1/2012 |
| JP | 2014-241525 | 12/2014 |

\* cited by examiner

*Primary Examiner* — Olisa Anwah
(74) *Attorney, Agent, or Firm* — Oblon, McClelland, Maier & Neustadt, L.L.P.

(57) ABSTRACT

An information processing apparatus is compatible with a High-Definition Multimedia Interface (HDMI) and serves as a sink device. The information processing apparatus comprising: a storage unit that stores therein recommended device information that is about a recommended source device and that includes a logical address and a vendor ID of the source device; and a controlling unit that obtains information about a logical address and a vendor ID of a source device connected to the information processing apparatus, compares the obtained information with the recommended device information, and if it is determined that the connected source device is not the recommended source device, performs control so as to allow the connected source device to be used while limiting a usage range of video and audio outputs.

6 Claims, 7 Drawing Sheets

| BLOCK 0 (0 TO 127 BYTES) | BLOCK 1 (128 TO 255 BYTES) |
|---|---|
| HEADER | HEADER |
| MANUFACTURE INFORMATION OF DEVICE | VERSION OF CEA 861 EXTENDED BLOCK |
| VERSION OF EDID | DESIGNATION OF VIDEO FORMAT |
| INFORMATION ABOUT DISPLAY | DESIGNATION OF AUDIO FORMAT |
| COLOR CHARACTERISTICS | VENDOR SPECIFIC DATA BLOCK |
| DESIGNATION OF VIDEO FORMAT | DESIGNATION OF VIDEO FORMAT |
| ⋮ | ⋮ |

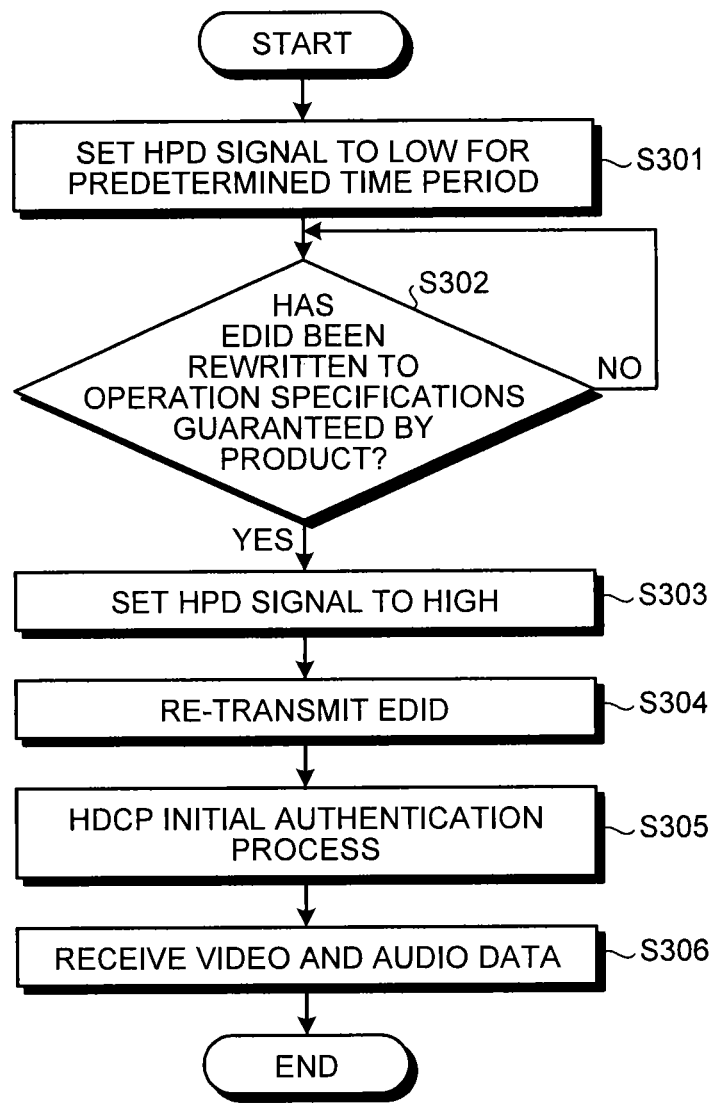

INFORMATION PROCESSING APPARATUS, INFORMATION PROCESSING METHOD, AND COMPUTER PROGRAM PRODUCT

CROSS-REFERENCE TO RELATED APPLICATIONS

The present application claims priority to and incorporates by reference the entire contents of Japanese Patent Application No. 2014-052757 filed in Japan on Mar. 14, 2014 and Japanese Patent Application No. 2015-008877 filed in Japan on Jan. 20, 2015.

BACKGROUND OF THE INVENTION

1. Field of the Invention

The present invention relates to an information processing apparatus, an information processing method, and a computer program product.

2. Description of the Related Art

In recent years, video conference systems used for having a teleconference between remote locations via a communication network such as the Internet have become popular. In such a video conference system, a terminal device of the video conference system is used for taking images of the inside of a conference room where one party of the teleconference is present, so that the taken images are converted into digital data and transmitted to the terminal devices for the other parties participating in the teleconference. Each of the terminal devices for the other parties displays the received images on a display device and outputs audio through a speaker. The video conference system configured in this manner enables the participants of the teleconference to have a conference between the remote locations, as if the participants were having the conference in the same location.

In addition, High-Definition Multimedia Interface (HDMI [registered trademark]) devices have also become popular. The HDMI technology is more and more popularly used in devices employed in video conference systems such as those described above.

As a part of the HDMI technology, for example, Patent Document 1 (Japanese Granted Patent No. 4502031) discloses a method by which a video display device stores, into a storage unit, a manufacturer name lookup table in which vendor IDs are associated with manufacturers' names of devices, as well as a device type lookup table in which logical addresses of devices are associated with character strings expressing types of the devices, so that on the basis of a vendor ID and a logical or physical address obtained from an external HDMI device, the manufacturer's name and the type of the device are displayed by referring to the tables stored in the storage unit.

However, in conventional HDMI-compatible video conference systems, the user is not able to find out whether an external device connected to an HDMI input terminal is one that is recommended by the manufacturer. Thus, when using a video conference system, if a user connects a device that is not recommended by the device manufacturer, the connection may not be established properly, or the usage expected by the manufacturer may not be available to the user.

There is a need to make it possible to use an external device serving as a source device connected to an HDMI-compatible information processing apparatus, regardless of whether the external device is recommended or not recommended by the manufacturer.

SUMMARY OF THE INVENTION

It is an object of the present invention to at least partially solve the problems in the conventional technology.

An information processing apparatus is compatible with a High-Definition Multimedia Interface (HDMI) and serves as a sink device. The information processing apparatus comprising: a storage unit that stores therein recommended device information that is about a recommended source device and that includes a logical address and a vendor ID of the source device; and a controlling unit that obtains information about a logical address and a vendor ID of a source device connected to the information processing apparatus, compares the obtained information with the recommended device information, and if it is determined that the connected source device is not the recommended source device, performs control so as to allow the connected source device to be used while limiting a usage range of video and audio outputs.

An information processing method is implemented by an information processing apparatus that is compatible with a High-Definition Multimedia Interface (HDMI) and serves as a sink device. The information processing method includes: obtaining, by a controlling unit of the information processing apparatus, information about a logical address and a vendor ID of a source device connected to the information processing apparatus; comparing, by the controlling unit, the obtained information with recommended device information that is stored in a storage unit of the information processing apparatus, that is about a recommended source device, and that includes a logical address and a vendor ID of the source device; and performing, by the controlling unit, control, if it is determined that the connected source device is not the recommended source device, so as to allow the connected source device to be used while limiting a usage range of video and audio outputs.

A computer program product includes a non-transitory computer-readable medium containing an information processing program. The program causes a computer of a controlling unit of an information processing apparatus that is compatible with a High-Definition Multimedia Interface (HDMI) and serves as a sink device, to perform: obtaining information about a logical address and a vendor ID of a source device connected to the information processing apparatus; comparing the obtained information with recommended device information that is stored in a storage unit of the information processing apparatus, that is about a recommended source device, and that includes a logical address and a vendor ID of the source device; and performing control, if it is determined that the connected source device is not the recommended source device, so as to allow the connected source device to be used while limiting a usage range of video and audio outputs.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a flowchart for explaining a characteristic operation performed by a video conference apparatus according to a third embodiment.

DETAILED DESCRIPTION OF THE PREFERRED EMBODIMENTS

Exemplary embodiments of an information processing apparatus used in a video conference system (hereinafter, "video conference apparatus") will be explained in detail below, with reference to the accompanying drawings.

First Embodiment

Figure 1:
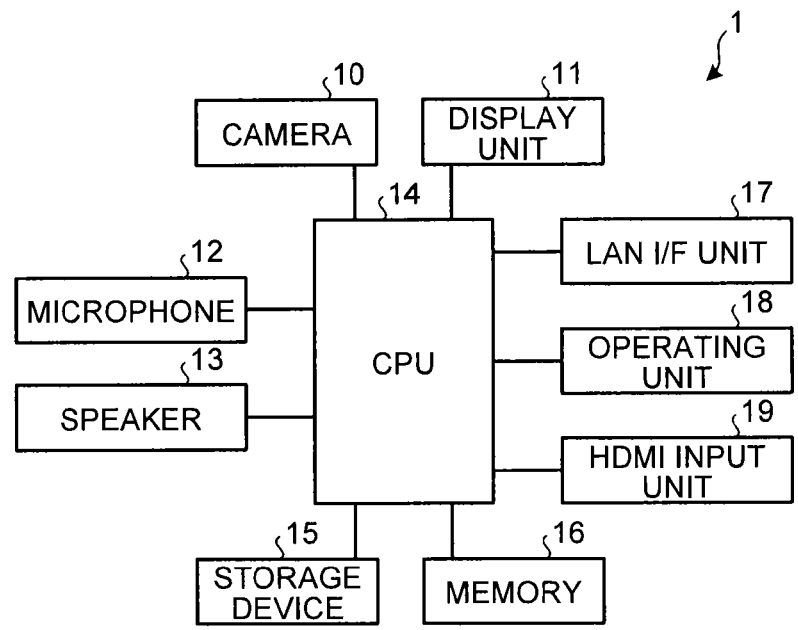
FIG. 1 is a block diagram of a video conference apparatus according to a first embodiment.

FIG. 1 is a block diagram of a video conference apparatus according to a first embodiment.

The video conference apparatus 1 includes a camera 10, a display unit 11, a microphone 12, a speaker 13, a Central Processing Unit (CPU) 14, a storage device 15, a memory 16, a Local Area Network Interface (LAN I/F) unit 17, an operating unit 18, and an HDMI input unit 19.

The camera 10 has a function of taking images of one or more conference participants (hereinafter, "conference participants") and transmitting image data thereof to the CPU 14. The display unit 11 has a function of displaying the image data received from the CPU 14 on a screen of the display unit 11. The display unit 11 is, more specifically, a display device such as a liquid crystal display device and, for example, has a function of displaying and inputting information through a touch panel. The microphone 12 has a function of collecting audio from the conference participants and transmitting the audio data to the CPU 14. The speaker 13 has a function of outputting the audio data received from the CPU 14 as audio.

The CPU 14 performs device control over the entirety of the video conference apparatus 1 and performs input/output control of the image data and the audio data in video conferences. The storage device 15 stores therein a computer program (hereinafter, "program") used for the device control performed by the CPU 14, a program used for the input/output control of the image data and the audio data in the video conferences, and a table (recommended device information) indicating logical addresses and vendor IDs of recommended devices. The storage device 15 is, more specifically, realized by using a non-volatile memory or a Hard Disk Drive (HDD). The memory 16 is used for causing programs used by the CPU 14 to be loaded therein and also for temporarily storing computation data therein. The memory 16 is, more specifically, realized by using a volatile memory such as a Random Access Memory (RAM).

The LAN I/F unit 17 is connected to other video conference apparatuses 1 via a network such as the Internet and is configured to transmit and receive the image data and the audio data. The LAN I/F unit 17 is, more specifically, an interface for use in a wired LAN compatible with 10 Base-T, 100 Base-TX, 1000 Base-T, or the like, or for use in a wireless LAN compatible with 802.11a/b/g/n. The operating unit 18 includes a keyboard, a button, and/or the like so that the user is able to perform device control over the video conference apparatus 1 by operating on the keyboard, the button, and/or the like.

To the HDMI input unit 19, an external device specific to the video conference system 1 can be connected. For example, when a high-performance optical zoom camera is connected thereto, the camera 10 is deactivated so that the high-performance optical zoom camera connected to the HDMI input unit 19 is preferentially used. In another example, if a device having an HDMI output terminal such as a notebook personal computer (PC) with a built-in camera is connected to the HDMI input unit 19, the camera 10 is deactivated in a similar manner.

Each of the video conference apparatuses 1 performs the following operation when transmitting and receiving the image data and the audio data.

When transmitting the data

The camera 10 and the microphone 12 obtain the image data and the audio data of the conference participants and transmit the obtained data to the CPU 14. The CPU 14 performs a prescribed image correction on the image data received from the camera 10 and subsequently transmits, via the LAN I/F unit 17, the corrected image data and the audio data received from the microphone 12 to the other video conference apparatuses 1 that are connected via the network such as the Internet.

When receiving the data

The video conference apparatus 1 receives, via the LAN I/F unit 17, the image data and the audio data transmitted thereto from the other video conference apparatuses 1 via the Internet. The CPU 14 transmits the image data to the display unit 11 and transmits the audio data to the speaker 13. The display unit 11 and the speaker 13 that have received the image and the audio data play back the images and the audio, respectively.

As a result of the video conference apparatus 1 repeatedly transmitting and receiving data to and from the other video conference apparatuses 1 connected via the network as described above, the conference participants are able to have a conference remotely.

Next, by using a specific example in which a plurality of video conference apparatuses are connected together, operations thereof will be explained.

Figure 2:
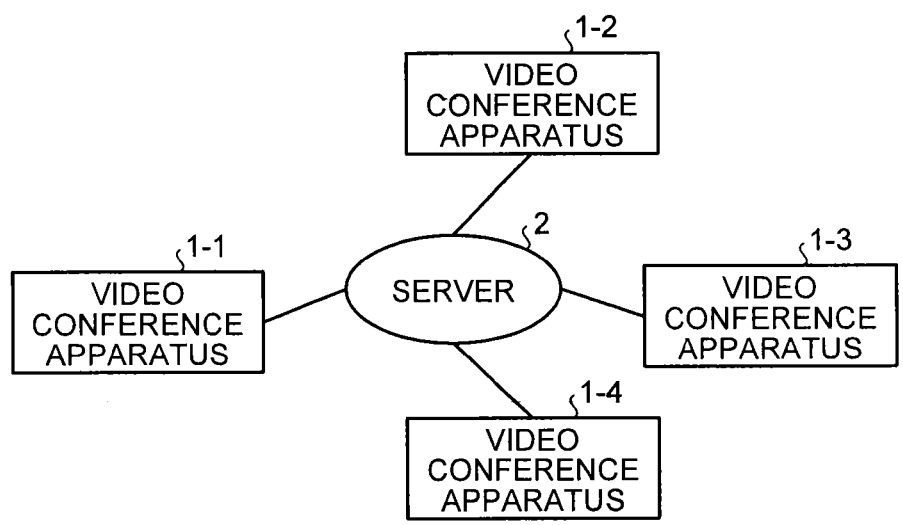
FIG. 2 is a drawing of an example of the connection between a plurality of (four, in this example) video conference apparatuses.

FIG. 2 is a drawing of an example of the connection between a plurality of (four, in this example) video conference apparatuses. In FIG. 2, the plurality of video conference apparatuses 1 are distinguished from one another by using the reference numerals 1-1 to 1-4; however, when it is not particularly necessary to specify one from the others, the reference numeral 1 will be used.

In the example illustrated in FIG. 2, the video conference apparatuses 1-1 to 1-4 are connected to a server 2 via a network such as the Internet.

The server 2 is configured, for example, to monitor whether each of the video conference apparatuses 1-1 to 1-4 is connected to the server 2 or not, to perform call control for calling the video conference apparatuses 1-1 to 1-4 when a conference is started, and to perform data transfer control for the video conference apparatuses 1-1 to 1-4 during the conference. As for the call control that is performed when the conference is started, provided that one of the video conference apparatuses 1 participating in the conference has designated the other video conference apparatuses 1 participating in the conference, the call control is realized by transmitting start request information for a session for a video conference to each of the other participating video conference apparatuses 1, so that a response to the start request information from each of the other video conference apparatuses 1 is transferred to the video conference apparatus 1 that transmitted the start request information, and the session is thus established among the video conference apparatuses 1 participating in the conference.

During the conference, as for the data transmission, each of the video conference apparatus 1 transmits the image data and the audio data to the server 2, as explained above. The server 2 transfers the image data and the audio data received from any of the video conference apparatuses 1 on the data transmission side to each of the other video conference apparatuses 1 participating in the conference. As for the data reception, each of the video conference apparatuses 1 receives the image data and the audio data from the other video conference apparatuses 1, which are transferred from the server 2. As a result of the data transfer control performed by the server 2 in this manner, each of the video conference apparatuses 1 participating in the conference is able to transmit and receive the data.

For example, in the configuration illustrated in FIG. 2, let us assume that the video conference apparatuses 1-1, 1-2, and 1-3 have a teleconference. The server 2 transmits image data and audio data transmitted thereto from the video conference apparatus 1-1 to the video conference apparatuses 1-2 and 1-3, but does not transmit any data to the video conference apparatus 1-4. Similarly, the server 2 transmits data from the video conference apparatus 1-2 and data from the video conference apparatus 1-3 to the participating video conference apparatuses 1-1 and 1-3 and to the participating video conference apparatuses 1-1 and 1-2, respectively, but does not transmit any data to the video conference apparatus 1-4, which is not participating in the conference.

As a result of the data transfer control performed by the server 2 in this manner, the participants of the conference are able to have the video conference among the plurality of specific video conference apparatuses 1 (between multiple locations).

Figures 3, 4:
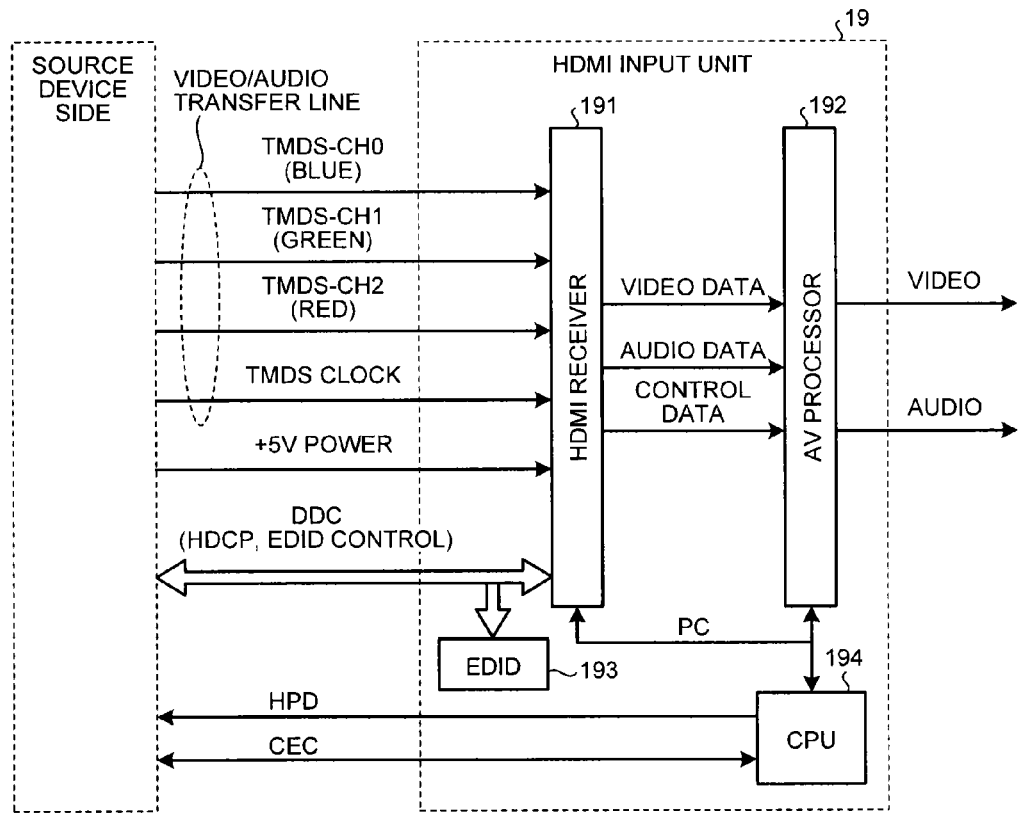
FIG. 3 is a table indicating details of EDID.
FIG. 4 is a block diagram of the HDMI input unit illustrated in FIG. 1.

FIG. 4 illustrates a configuration of the HDMI input unit 19 shown in FIG. 1. The HDMI input unit 19 includes an HDMI receiver 191, an Audio Video (AV) processor 192, an Extended Display Identification Data (EDID) memory 193 configured by using a rewritable Read-Only Memory (ROM), and a CPU 194 (serving also as the CPU 14 illustrated in FIG. 1). As illustrated in FIG. 4, the configuration is the same as a commonly-used configuration of an HDMI input unit of a sink device. Thus, detailed explanation thereof will be omitted. The HDMI receiver 191 and the AV processor 192 are controlled by the CPU 194 (the CPU 14) shown in FIG. 4. Further, as for data writing to the EDID memory 193, data can be written to the EDID memory 193 via the HDMI receiver 191 through an I2C bus, according to an instruction from the CPU 194.

Figure 5:
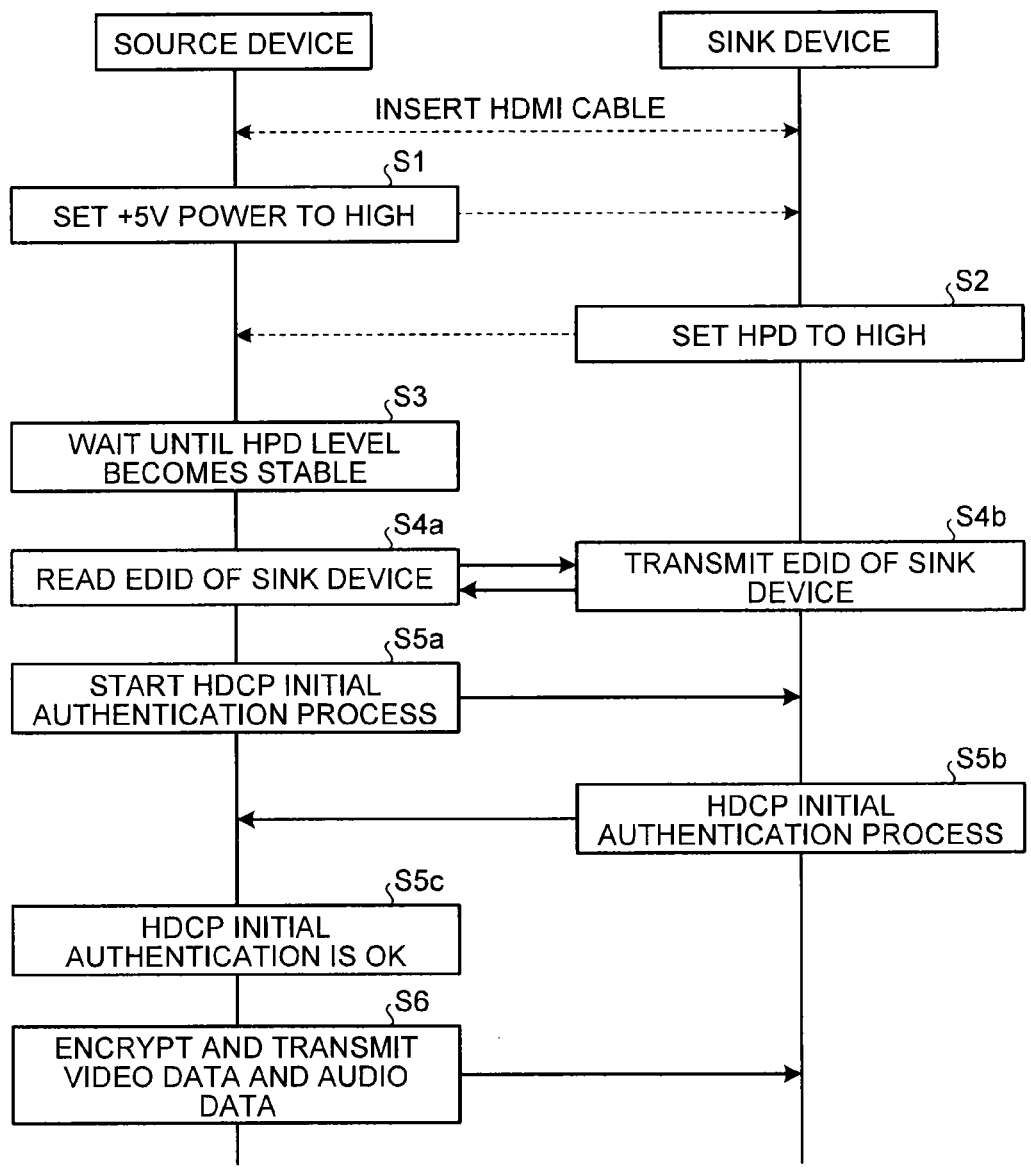
FIG. 5 is a sequence chart for explaining an outline of a connection process using HDMI.

Next, a connection process between the HDMI input unit 19 and an HDMI-compatible external device will be briefly explained. FIG. 5 is a sequence chart for explaining an outline of the connection process using HDMI.

One of the characteristics of HDMI systems is that, by connecting any HDMI-compatible devices together with a cable, it is possible to display video and to output audio without the need to install a driver. This function is called "plug and play". The process in this function can be explained as below. A device that has an HDMI input terminal and is configured to display and output an AV stream (video data and audio data) is called a "sink device". A device that has an HDMI output terminal and is configured to output an AV stream is called a "source device". In the first embodiment, each of the video conference apparatuses 1 corresponds to a sink device.

Let us assume that a source device and a sink device are connected to each other by using an HDMI cable.

[Step 1]: The source device sets the +5V PWR pin of the HDMI cable to a high level (step S1).

[Step 2]: When having detected that the +5V PWR pin is at the high level, the sink device causes a transition in the Hot Plug Detect (HPD) pin from a low level to a high level, if EDID of the sink device is in a readable state (step S2).

[Step 3]: The source device waits a while until the level of the HPD becomes stable (step S3).

[Step 4]: When having detected that the HPD is stable at the high level, the source device reads the EDID of the sink device (step S4a). At that time, the sink device transmits the EDID in response to a request from the source device (step S4b). The EDID stores therein (see FIG. 3) information about the display performance of the sink device (e.g., a video format (a resolution (1920×1080, 1080×720, or the like), progressive(p)/interlace(i), a frame rate (59.94 kHz, 50 kHz, or the like)), an audio format (an encoding method (Advanced Audio Coding [AAC], Digital Theater System [DTS], Pulse Code Modulation [PCM], or the like), a bit rate (16 bits, 20 bits, 24 bits, or the like), a sampling frequency (32 kHz, 44 kHz, 48 kHz, or the like)), product information). The source device reads the information and determines which format shall be used to transmit the video and the audio.

[Step 5]: The source device starts a so-called High-bandwidth Digital Content Protection (HDCP) initial authentication process with the sink device (step S5a). The sink device performs the HDCP initial authentication process with the source device (step S5b).

[Step 6]: When the HDCP initial authentication process is completed (HDCP initial authentication is OK: S5c), the source device encrypts the video and audio data and outputs the encrypted data to the sink device (step S6).

According to the process described above, the video conference apparatus 1 serving as a sink device exchanges data with the external device. The source device obtains the information about the video conference apparatus 1 serving as a sink device from the EDID and transmits the image data and the audio data to the sink device, in accordance with the video format and the audio format thereof. However, it is unknown to the video conference apparatus 1 serving as a sink device what type of device the source device is. For this reason, the video conference apparatus 1 serving as a sink device makes a vendor ID request and a logical address request, by using a Consumer Electronics Control (CEC) function described below.

The Consumer Electronics' Control (CEC) is a control protocol that enables devices connected via HDMI to operate in cooperation with each other. The CEC is defined by HDMI (version 1.2a or later). By using one signal line of HDMI, it is possible to control multiple devices in conjunction with one another with the use of a single remote controller, for example.

By making use of the CEC function, it is possible to obtain the logical address and the physical address of the external device, the state of the external device, setting information of the external device, and the type of the external device, with the use of a CEC command. Thus, when having detected that an external device is connected to the HDMI input unit 19, the video conference apparatus 1 (more specifically, the CPU 14) obtains the name, state information, and setting information of the external device serving as a source device, with the use of a CEC command or a vendor command and stores the obtained information into the memory 16. Here, the state information indicates, for example, whether the external device has a disk or not, the HD capacity of the recorder, and/or the like. The setting information is information about a characteristic parameter and/or the like used when playing back the video and the audio.

The CEC is designed so as to be able to use 0 to 15 as a logical address, which is unique within a network according to the HDMI. Further, the logical address varies according to the type of the external device. It is therefore possible to find out the type of the external device on the basis of the logical address thereof.

The physical address is unique in a network according to the HDMI. When an external device is added to or separated from the network, the physical address is automatically adjusted. The physical address is able to specify one of five hierarchical levels and is expressed with a number that is unique on each hierarchical level, by using the "n.n.n.n" format. A display device is on the first hierarchical level and the physical address thereof is expressed as "0.0.0.0". The physical addresses on the hierarchical level (the second hierarchical level) for external devices that are directly connected to the display device are expressed as "1.0.0.0", "2.0.0.0", and so on. Further, for example, when an external device (on the third hierarchical level) is further connected to an external device having the physical address "2.0.0.0", the physical address thereof is expressed as "2.1.0.0". By expressing the addresses in this manner, it is possible to determine the physical addresses of the display device and the external devices for each of the five hierarchical levels.

Figure 6:
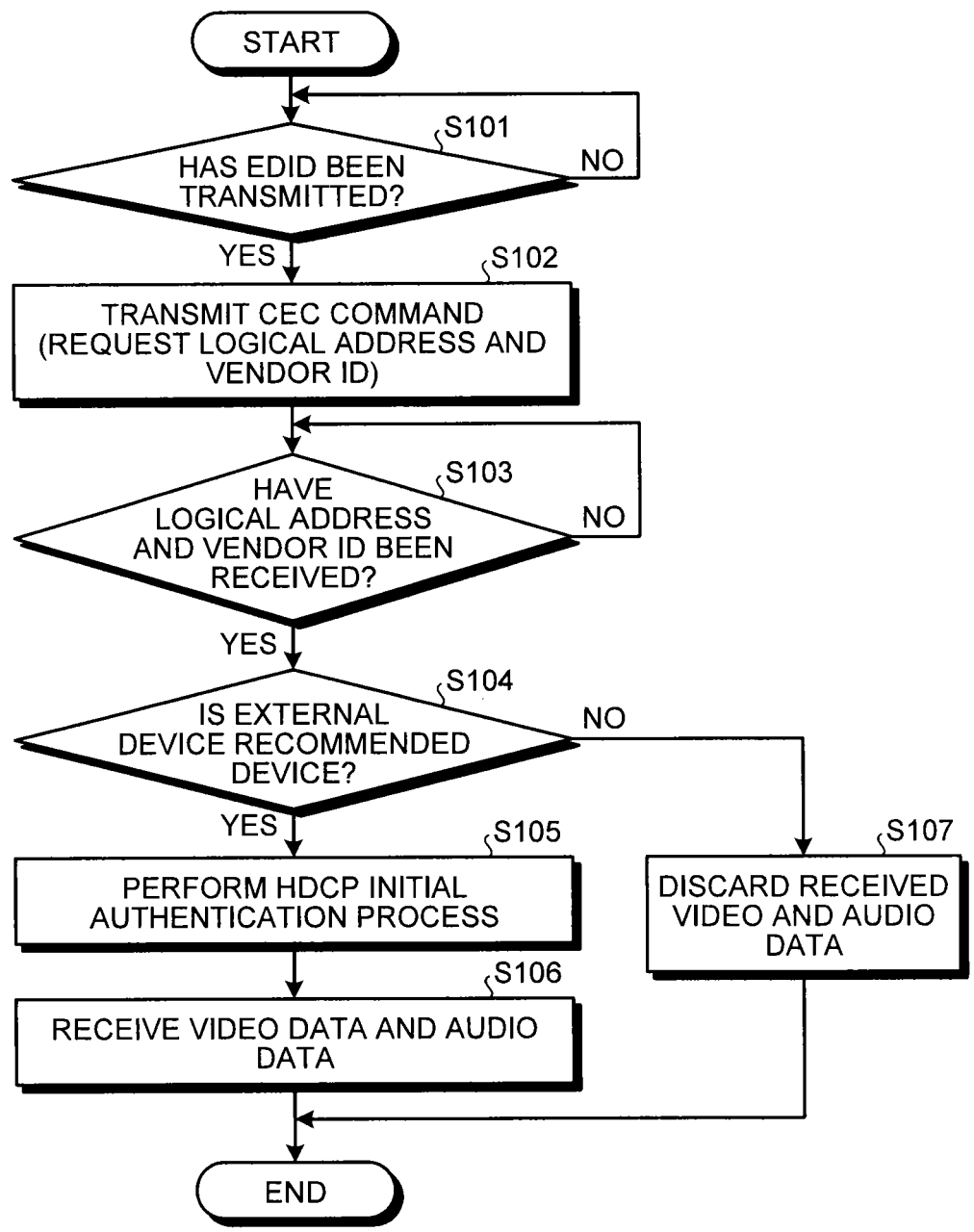
FIG. 6 is a flowchart for explaining a characteristic operation performed by the video conference apparatus according to the first embodiment.

Next, a characteristic operation of the video conference apparatus according to the first embodiment will be explained, with reference to the flowchart in FIG. 6. The following describes an operation performed after an external device is connected to the video conference apparatus 1.

The HDMI input unit 19 of the video conference apparatus 1 serving as a sink device sets the HPD to a high level and waits for an EDID read request transmitted from the external device serving as a source device. When having received an EDID read request from the external device, the HDMI input unit 19 transmits the EDID of the video conference apparatus 1 to the external device (step S101). The operation up to this point is the same as the commonly-used operation explained with reference to FIG. 5.

After that, when the CPU 194 (i.e., the CPU 14) of the HDMI input unit 19 has confirmed that the EDID has been transmitted (step S101: Yes), the CPU 194 (the CPU 14) transmits a CEC command exclusively used for obtaining the logical address and the vendor ID of the external device, to the external device (step S102). Subsequently, the HDMI input unit 19 receives the logical address and the vendor ID from the external device.

When the CPU 194 (the CPU 14) of the HDMI input unit 19 has confirmed that the logical address and the vendor ID were received from the external device (step S103: Yes), the CPU 194 (the CPU 14) refers to the storage device 15 to judge whether the external device is a recommended device (step S104). The video conference apparatus 1 has a table stored in the storage device 15 illustrated in FIG. 1, the table indicating the logical addresses and the vendor IDs of recommended devices. The CPU 194 (the CPU 14) of the HDMI input unit 19 is therefore able to judge whether the external device is a recommended device or not, by comparing the logical address and the vendor ID received from the external device with the logical addresses and the vendor IDs in the table.

Here, if the external device is a recommended device (step S104: Yes), the HDMI input unit 19 performs a normal initial authentication process (step S105), and subsequently receives video data and audio data from the external device (step S106).

On the contrary, if the external device is not a recommended device (step S104: No), the HDMI input unit 19 discards all of the video data and the audio data received from the external device (step S107) to cause the video and the audio not to be output. Here, the "discarding" process is performed by, for example, overwriting the data stored by the AV processor 192 illustrated in FIG. 4 in the memory provided therein (not illustrated), with prescribed data (e.g., 0). Alternatively, if the AV processor 192 is realized by using a Field Programmable Gate Array (FPGA) or the like, in order to perform the "discarding" process, a selector may be provided inside the FPGA to perform switching to an unconnected circuit when the AV processor 192 has obtained information from the CPU 194 indicating that the external device is not a recommended device.

Figure 8:
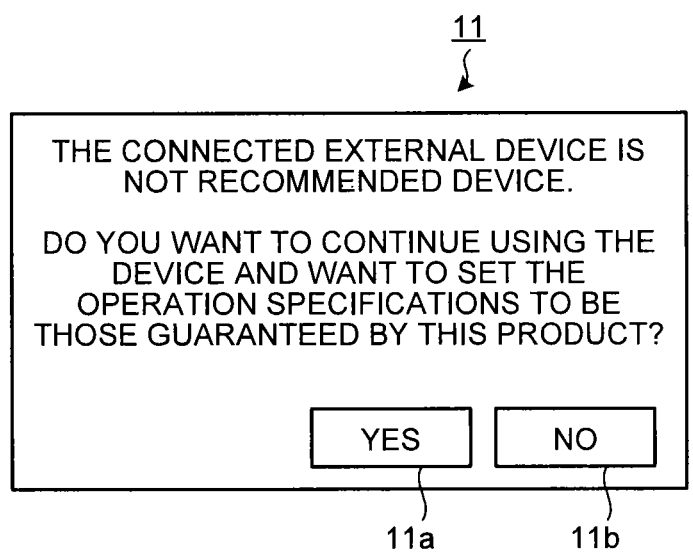
FIG. 8 is a drawing of an example of a display when an external device is not a recommended device.

Further, if the external device connected via an HDMI connection is not a recommended device, the CPU 14 causes the display unit 11 to display information indicating the situation, so as to alert the user. An example of such a display is illustrated in FIG. 8.

As explained above, according to the first embodiment, by causing the video and the audio not to be output if the external device serving as a source device is not a recommended device for the video conference apparatus 1 according to the first embodiment serving as a sink device, it is possible to substantially restrict the conference participants from using the external device that is not a recommended device. In addition, by displaying the information indicating that the external device is not a recommended device, it is possible to inform the conference participants that the external device that is not a recommended device is connected to the video conference apparatus 1 and that it is not a failure of the device.

Second Embodiment

Next, a video conference apparatus according to a second embodiment will be explained. The hardware configuration of the video conference apparatus according to the second embodiment is the same as that of the video conference apparatus according to the first embodiment described above. Thus, the explanation thereof will be omitted.

Figure 7:
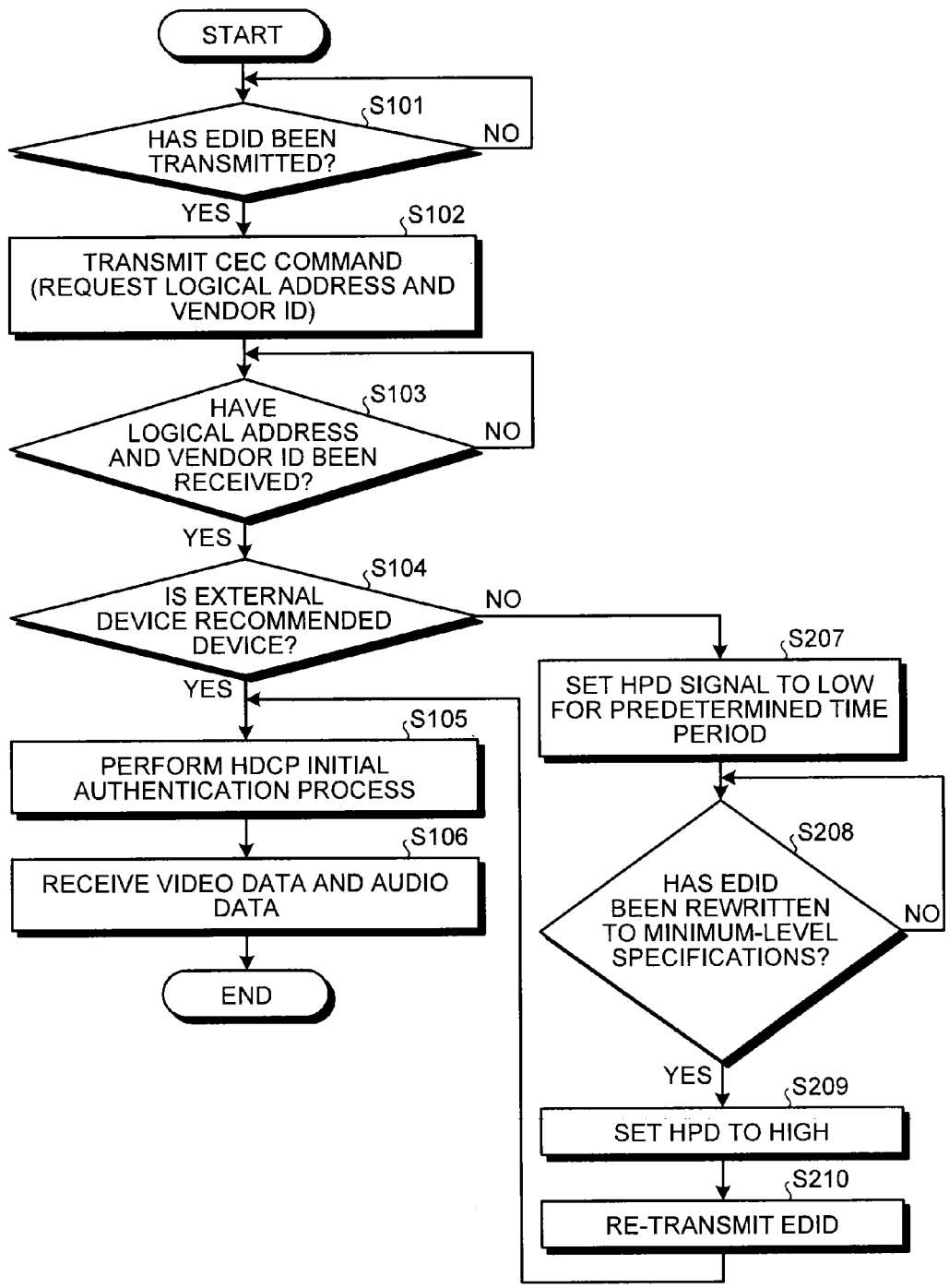
FIG. 7 is a flowchart for explaining a characteristic operation performed by a video conference apparatus according to a second embodiment.

Next, a characteristic operation of the video conference apparatus according to the second embodiment will be explained with reference to a flowchart in FIG. 7. The following describes an operation performed after an external device serving as a source device is connected to the video conference apparatus 1 serving as a sink device.

The HDMI input unit 19 of the video conference apparatus 1 serving as a sink device, at first, sets the HPD to a high level and waits for an EDID read request transmitted from the external device serving as a source device. When having received an EDID read request from the external device, the HDMI input unit 19 transmits the EDID of the video conference apparatus 1 to the external device (step S101). The operation up to this point is the same as the commonly-used operation explained with reference to FIG. 5. The operations at steps S101 to S106 described below are the same as those in the first embodiment.

After that, when the CPU 194 (i.e., the CPU 14) of the HDMI input unit 19 has confirmed that the EDID has been transmitted (step S101: Yes), the CPU 194 (the CPU 14) transmits a CEC command exclusively used for obtaining the logical address and the vendor ID of the external device, to the external device (step S102). Subsequently, the HDMI input unit 19 receives the logical address and the vendor ID from the external device.

When the CPU 194 (the CPU 14) of the HDMI input unit 19 has confirmed that the logical address and the vendor ID were received from the external device (step S103: Yes), the CPU 194 (the CPU 14) refers to the storage device 15 to judge whether the external device is a recommended device (step S104). The video conference apparatus 1 has a table stored in the storage device 15 illustrated in FIG. 1, the table indicating the logical addresses and the vendor IDs of recommended external devices. The CPU 194 (the CPU 14) of the HDMI input unit 19 is therefore able to judge whether the external device is a recommended device or not, by comparing the logical address and the vendor ID received from the external device with the table.

Here, if the external device is a recommended device (step S104: Yes), the HDMI input unit 19 performs a normal initial authentication process (step S105), and subsequently receives video data and audio data from the external device (step S106).

On the contrary, if the external device is not a recommended device (step S104: No), the HDMI input unit 19 sets the HPD signal to a low level for a predetermined period of time (step S207).

During that period, into the rewritable EDID memory 193 in which the EDID of the video conference apparatus 1 has already been written, the CPU 194 (the CPU 14) of the HDMI input unit 19 rewrites specification data of the minimum level (a video format and an audio format having the lowest quality) stored in the storage device 15, as an EDID. When the rewriting process is completed (step S208: Yes), the CPU 194 (the CPU 14) of the HDMI input unit 19 sets the HPD signal to a high level (step S209), and the HDMI input unit 19 re-transmits the newly-rewritten EDID by the procedure described above with reference to FIG. 5 (step S210).

When the external device serving as a source device reads the new EDID, the external device determines the formats (a resolution, a frame rate, encoding, a bit rate, and/or the like) of the data to be output, on the basis of the read information. In other words, the external device serving as a source device transmits video data and audio data that are in the video format and the audio format having the lowest quality, to the video conference apparatus 1 serving as a sink device.

As a result, the video conference apparatus 1 outputs the video and the audio having the lowest quality based on the specification data of the minimum level, and thus it is possible to limit the usage by the users (the conference participants) when the external device is not a recommended device. The specification data used in the description above does not necessarily have to be of the minimum level (having the lowest quality). Any specification data that makes the quality of the video and the audio lower than the normal levels may b used. In other words, for example, the resolution, the bit rate, and/or the number of frames of the video are lowered, and the audio level and/or the volume of the audio are lowered.

Further, if the external device connected via an HDMI connection is not a recommended device, the CPU 14 causes the display unit 11 to display information indicating the situation, so as to alert the user. An example of such a display is illustrated in FIG. 8.

Third Embodiment

Next, a video conference apparatus according to a third embodiment will be explained. In the first and the second embodiments described above, the methods for limiting the usage (by discarding the video and audio data and by outputting the video and the audio having the lowest quality) when the external device connected via an HDMI connection is a non-recommended device are explained. However, it is necessary to take into consideration the user's need to enable the use of an external device, even if the external device connected via an HDMI connection is a non-recommended device. In the third embodiment, to address such a situation, an operation to cancel the usage limitation and an example of operations after the cancellation will be explained.

The hardware configuration of the video conference apparatus according to the third embodiment is the same as that of the video conference apparatus according to the first embodiment described above. Thus, the explanation thereof will be omitted.

In the third embodiment, as illustrated in FIG. 8, the following information is displayed on the display unit 11, so as to alert the user and to enable the user to select whether the continued use of the device continues it to be enabled or not. In FIG. 8, for example, the message "The connected external device is not a recommended device. Do you want to continue using the device and want to set the operation specifications to be those guaranteed by this product?" is displayed, and selection buttons 11*a* and 11*b* for "Yes" and "No" are displayed.

In the example in FIG. 8, if the selection button 11*b* for "No" is pressed, the operations described above in the first and the second embodiments are performed. On the contrary, if the selection button 11*a* for "Yes" is pressed, it is determined that the external device connected via the HDMI connection will continue being used, and the operations illustrated in FIG. 9 described below will be performed.

FIG. 9 is a flowchart for explaining a characteristic operation performed by the video conference apparatus according to the third embodiment. The following describes an operation performed by the CPU 14 after an external device serving as a source device is connected to the video conference apparatus 1 serving as a sink device and the selection button 11*b* for "No" has been selected.

The HDMI input unit 19 of the video conference apparatus 1 serving as a sink device, at first, sets the HPD to a low level for a predetermined period of time (step S301). Subsequently, it is judged whether the EDID has been rewritten with operation specifications guaranteed by the product (step S302). If it has been determined that the EDID was rewritten (step S302: Yes), the HPD signal is set to a high level (step S303). Subsequently, the EDID is re-transmitted (step S304), the HDP initial authentication process is performed (step S305), and video and audio data are received (step S306).

At step S301 described above, because the HPD signal has the function for detecting a receiver when a cable is connected, by causing the HPD signal to be at the low level for the predetermined period of time, an artificially-created situation where no cable is connected is detected. Further, when the HPD signal is set to the high level at step S303, the situation where the cable is connected is detected again, so that the reading of the EDID is started. Here, because the HPD signal is an output signal from the sink device, the output signal is usually within approximately 1 s, although the length may vary depending on the start-up time period in the sink device.

The operation described above will be further explained. Into the rewritable EDID memory 193 in which the EDID of the video conference apparatus 1 has already been written, the CPU 194 (the CPU 14) of the HDMI input unit 19 rewrites data (a video format and an audio format) that guarantees operations and is stored in the storage device 15, as an EDID. When the rewriting process is completed, the CPU 194 (the CPU 14) of the HDMI input unit 19 sets the HPD signal to a high level and re-transmits the newly-rewritten EDID by the procedure described above with reference to FIG. 5.

When the external device serving as a source device reads the new EDID, the external device determines the formats (a resolution, a frame rate, encoding, a bit rate, and/or the like)

of the data to be output, on the basis of the read information. In other words, to the video conference apparatus 1 serving as a sink device, the external device serving as a source device transmits the video data and the audio data that are in the best video data and audio data formats among the operation specifications guaranteed by the sink device.

Here, the EDID information of the source device is determined on the basis of standards for the HDMI specifications. For example, if the resolutions that are supported by the sink device are 640×360 and 1280×720, the source device sends the video signal to the sink device by using the highest resolution (1280×720 in the present example) among the supported resolutions. In another example, the EDID information is determined in the same manner when the source device supports the resolution of 1920×1080.

As a result, the video conference apparatus 1 outputs the video and the audio that guarantee the operation specifications, and thus, even if the external device is not a recommended device, the user is able to use the device without the usage limitation.

As explained above, according to the third embodiment, when the external device serving as a source device is not a recommended device for the video conference apparatus 1 according to the third embodiment serving as a sink device, it is possible to substantially limit the usage of the external device, which is not a recommended device, by lowering the quality of the video and the audio that are output. In addition, according to the third embodiment, by displaying the information indicating that the external device is not a recommended device, it is possible to inform the conference participants that the external device that is not a recommended device is connected to the video conference apparatus 1 and that it is not a failure of the device.

In the various embodiments described above, the video conference apparatuses 1 are explained as examples. However, the present disclosure is not limited to these examples. The present disclosure is also applicable to an information processing apparatus serving as an HDMI-compatible sink device (i.e., having an HDMI input function) such as a television, a projector, or the like.

Although the above embodiments are described based on the HDMI technology, possible embodiments are not limited to those related to the HDMI technology. The present disclosure is similarly applicable to other types of interface technology (e.g., Displayport, Digital Visual Interface [DVI]) that use a similar initialization procedure.

Further, the control program executed by the video conference apparatuses 1 in any of the various embodiments described above may be provided as being incorporated in a Read-Only Memory (ROM) in advance. Further, the control program may also be provided as being recorded in a file that is in an installable or executable format, on a computer-readable recording medium such as a Compact Disk Read-Only Memory (CD-ROM), a Flexible Disk (FD), a Compact Disk Readable (CD-R), a Digital Versatile Disk (DVD), or the like. Alternatively, the control program may be stored in a computer connected to a network such as the Internet so that the control program is provided or distributed as being downloaded via the network.

An embodiment makes it possible to use the external device serving as a source device connected to the HDMI-compatible information processing apparatus, regardless of whether the external device is recommended or not recommended by the manufacturer.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus that is compatible with a High-Definition Multimedia Interface (HDMI) and serves as a sink device, comprising:
   a memory that stores therein recommended device information of a recommended source device, which includes a logical address and a vendor ID of the recommended source device; and
   processing circuitry that obtains information about a source logical address and a source vendor ID of a source device connected to the information processing apparatus, compares the obtained information with the recommended device information, and when it is determined that the connected source device is not the recommended source device, causes a display to display information indicating the determination and an inquiry inquiring whether a user wants to limit a usage range of video and audio outputs, and when the user indicates that the usage range should be limited, performs control so as to allow the connected source device to be used while limiting the usage range of the video and audio outputs.

2. The information processing apparatus according to claim 1, wherein the processing circuitry realizes the limiting by discarding data received from the connected source device.

3. The information processing apparatus according to claim 1, wherein the processing circuitry realizes the limiting by lowering a quality of video and audio data transmitted from the connected source device by rewriting EDID data of the information processing apparatus.

4. An information processing method implemented by an information processing apparatus that is compatible with a High-Definition Multimedia Interface (HDMI) and serves as a sink device, the information processing method comprising:
   obtaining, by processing circuitry of the information processing apparatus, information about a source logical address and a source vendor ID of a source device connected to the information processing apparatus;
   comparing, by the processing circuitry, the obtained information with recommended device information that is stored in a memory of the information processing apparatus, that is about a recommended source device, and that includes a logical address and a vendor ID of the recommended source device; and
   causing, by the processing circuitry, when it is determined that the connected source device is not the recommended source device, a display to display information indicating the determination and an inquiry inquiring whether a user wants to limit a usage range of video and audio outputs, and when the user indicates that the usage range should be limited, performing control so as to allow the connected source device to be used while limiting the usage range of the video and audio outputs.

5. A computer program product comprising a non-transitory computer-readable medium containing an information processing program, the program causing processing circuitry of an information processing apparatus that is compatible with a High-Definition Multimedia Interface (HDMI) and serves as a sink device, to perform:
   obtaining information about a source logical address and a source vendor ID of a source device connected to the information processing apparatus;
   comparing the obtained information with recommended device information that is stored in a memory of the information processing apparatus, that is about a recommended source device, and that includes a logical address and a vendor ID of the recommended source device; and causing, when it is determined that the connected source device is not the recommended source device, a display to display information indicating the determination and an inquiry inquiring whether a user wants to limit a usage range of video and audio outputs, and when the user indicates that the usage range should be limited, performing control so as to allow the connected source device to be used while limiting the usage range of the video and audio outputs.

6. The information processing apparatus of claim 1, wherein the processing circuitry is further configured to not limit the usage range of the video and audio outputs, when the user indicates that the usage range should be limited.

\* \* \* \* \*